US008468623B2

(12) United States Patent
(10) Patent No.: US 8,468,623 B2
(45) Date of Patent: Jun. 25, 2013

Patterson et al.

(54) LIFT CHAIR

(75) Inventors: Richard A. Patterson, Georgetown, TX (US); Roy M. Patterson, Pflugerville, TX (US)

(73) Assignee: Richard A. Patterson, Georgetown, TX (US)

( * ) Notice: Subject to any disclaimer, the term of this patent is extended or adjusted under 35 U.S.C. 154(b) by 384 days.

(21) Appl. No.: 12/813,452

(22) Filed: Jun. 10, 2010

(65) Prior Publication Data

US 2011/0302712 A1 Dec. 15, 2011

(51) Int. Cl.
*A61G 7/10* (2006.01)
*A61G 5/00* (2006.01)
*B60N 2/00* (2006.01)

(52) U.S. Cl.
USPC .................... 5/88.1; 5/81.1 R; 5/83.1; 5/85.1; 5/87.1; 5/86.1; 5/84.1; 5/89.1; 297/330

(58) Field of Classification Search
USPC ......... 5/81.1 R, 83.1–89.1; 297/330, DIG. 10
See application file for complete search history.

(56) References Cited

U.S. PATENT DOCUMENTS

| | | | | |
|---|---|---|---|---|
| 2,565,761 | A * | 8/1951 | Dean | 5/86.1 |
| 3,302,219 | A * | 2/1967 | Harris | 5/85.1 |
| 3,493,979 | A * | 2/1970 | Crook, Jr. et al. | 5/81.1 C |
| 3,871,036 | A | 3/1975 | Attenburrow | |
| 3,940,808 | A | 3/1976 | Petrini | |
| 3,967,328 | A | 7/1976 | Cox | |
| 4,087,873 | A | 5/1978 | Ohkawa | |
| 4,156,946 | A * | 6/1979 | Attenburrow | 5/81.1 C |
| 4,232,412 | A * | 11/1980 | Petrini | 5/83.1 |
| 4,432,359 | A * | 2/1984 | James | 5/87.1 |
| 4,679,259 | A * | 7/1987 | DiMatteo et al. | 5/81.1 C |
| 4,680,818 | A * | 7/1987 | Ooka et al. | 5/81.1 C |
| 4,747,170 | A * | 5/1988 | Knouse | 5/81.1 HS |
| 4,776,047 | A | 10/1988 | DiMatteo | |
| 4,794,655 | A | 1/1989 | Ooka et al. | |
| 5,185,894 | A | 2/1993 | Bastert et al. | |
| 5,187,821 | A * | 2/1993 | Nieminen et al. | 5/83.1 |
| 5,201,084 | A * | 4/1993 | Johnson | 5/86.1 |
| 5,396,669 | A * | 3/1995 | Nieminen | 5/83.1 |
| 5,540,321 | A * | 7/1996 | Foster | 198/510.1 |
| 5,692,253 | A | 12/1997 | Keijser et al. | |
| 5,697,109 | A * | 12/1997 | Hodgetts | 5/81.1 R |
| 5,704,083 | A | 1/1998 | Nerg | |
| 5,708,993 | A | 1/1998 | Campbell et al. | |
| 5,937,456 | A * | 8/1999 | Norris | 5/88.1 |
| 6,006,376 | A * | 12/1999 | Williamson | 5/81.1 R |
| 6,049,923 | A * | 4/2000 | Ochiai | 5/88.1 |
| 6,289,533 | B1 * | 9/2001 | Hodgetts | 5/81.1 R |

(Continued)

*Primary Examiner* — William Kelleher
*Assistant Examiner* — Eric Kurilla
(74) *Attorney, Agent, or Firm* — Jack V. Musgrove

(57) ABSTRACT

A lift apparatus has a frame with open sides and a web assembly slidably retained along the sides which extends from one end of the frame to the other. While the web assembly is retracted, the frame moves to pass around a mobility-impaired individual and rest against the surface supporting the individual. The web assembly is then extended to move underneath or behind the individual, providing lifting support. The frame is configurable for orientations ranging continuously between horizontal and upright sitting. The web assembly has an upper web contacting the individual, a lower web contacting the support surface, a strength layer carrying the individual's weight, and a roller nose bar assembly which is pulled to extend the web assembly. A hand-held power tool can drive the web assembly, adjustment of inclinations of the back and leg sections of the frame, and vertical motion of the lift arm.

11 Claims, 13 Drawing Sheets

U.S. PATENT DOCUMENTS 6,591,435 B1 * 7/2003 Hodgetts .......................... 5/88.1
6,932,209 B2 * 8/2005 Kasagami et al. ............ 198/312
6,971,126 B1 12/2005 Kluckhuhn
7,062,804 B2 * 6/2006 Rouse et al. ..................... 5/83.1
7,200,881 B2 * 4/2007 Kasagami et al. ........... 5/81.1 R
7,360,262 B2 * 4/2008 Mowery ........................... 5/87.1
7,434,278 B2 * 10/2008 White et al. ................. 5/81.1 R
7,571,498 B2 * 8/2009 Jewell et al. ............... 5/81.1 HS
7,950,080 B2 * 5/2011 Brossart et al. .............. 5/81.1 C
2003/0110559 A1 * 6/2003 Weigand ...................... 5/81.1 R
2003/0213064 A1 11/2003 Johnson
2007/0000049 A1 * 1/2007 White et al. ..................... 5/84.1
2009/0178193 A1 7/2009 Jewell et al.

* cited by examiner

LIFT CHAIR

BACKGROUND OF THE INVENTION

1. Field of the Invention

The present invention generally relates to moving systems for mobility-impaired individuals, and more particularly to a configurable lift chair which allows the user to be acquired from or transferred to a position adjacent the lift chair in either a sitting or laying position.

2. Description of the Related Art

In the United States alone, there are millions of physically challenged individuals who are confined to wheelchairs due to illness, accidents or degenerative diseases. While some these people are able to stand on their own, many are unable to support their weight on their legs. People who are unable to stand or otherwise lift their weight with their arms face many difficulties in their daily lives. One of the most serious of these is that they must be frequently lifted and transferred between their wheelchairs and their beds, regular chairs, dining facilities, bathroom fixtures, cars, etc. In nursing homes for example, it is estimated that patients must be lifted and transferred 8 to 15 times per day depending on their illness and physical condition.

Lifting and moving these individuals usually is done by family members, friends or professional care givers in home care situations, and by trained nurses or therapists in institutional settings. Occasionally, commercially available lifting aids are employed to assist with patient lifting, but because of limitations and ease of use issues, most patient lifting and transfers are done manually. Whenever disabled individuals are lifted or moved, there is a possibility for injuring that person. These injuries usually result when the patient is bumped into objects while being lifted and transferred, or from being dropped.

When caregivers manually lift and transfer patients, they can also seriously injure themselves, particularly their backs. Often the patient being lifted is significantly heavier than the care giver, and cannot assist the care giver during the move. Some patients move erratically while being moved and may slip out of the care givers grasp, forcing the care giver to quickly readjust her lifting position. Lifting and moving heavy (bariatric) patients is a major reason many nurses have left that profession.

There are several mechanized patient lift and transfer systems which provide an alternative for lifting and transferring a patient or mobility-impaired individual. However, these devices and systems have serious shortcomings, and do not address the total need associated with safely lifting, transferring, and transporting handicapped individuals within their daily living and healthcare environments. One device commonly used is a hoist or crane in which the patient is supported in a flexible sling. This device, referred to generically as a Hoyer lift, consists of a pivoted arm mounted to a base having casters. The arm can be moved by a hydraulic cylinder, and the patient lifting sling is typically attached to the end of the arm by a lifting bridle. One example of such a lift is illustrated in U.S. Pat. No. 3,940,808.

While the Hoyer-type lift designs are fairly simple and thus relatively inexpensive, they can cause serious discomfort or injury for the mobility-impaired individual. If a sling is used to carry the individual, it places the patient in an awkward position under compression. Patients have also characterized sling transfers as undignified and humiliating. Lift designs which use rigid supports, such as the foldable seat panels in the ’808 patent, create very high localized shear and pressure stresses on the patient which can lead to skin breakdown (especially in the elderly) and to the generation of painful pressure ulcers or bed sores.

Another significant problem with lift designs is the requirement that the patient support feature (e.g., sling or seat) be pre-positioned under the patient prior to deployment of the device. This requirement entails significant manual moving, lifting, and/or rolling of the patient by a caregiver to properly prepare for acquisition by the lift. Such manual manipulation of the patient can be both uncomfortable and unsafe for the patient as well as for the caregiver. During this preparation process, injuries to the patient resulting from falling off the side of the bed are common. Such patient manipulation also increases the likelihood of contagion, i.e., nosocomial infections such as antibiotic-resistant staph, creating additional risk for the patient.

Alternative patient moving systems have been devised which attempt to remove the requirement of pre-positioning a patient support feature. Many of these systems rely on one or more webs or belts which move as the system acquires or delivers the user in order to reduce frictional engagement. One example of such a patient-moving device is illustrated in U.S. Pat. No. 4,794,655. Upper and lower belts circulate around upper and lower plates, and are let out or taken up as the upper and lower plates are extended or retracted alongside the patient. The ’655 transfer table can further be divided into three sections whose orientation can be adjusted for a sitting position. The lifting/transferring device of U.S. Pat. No. 3,967,328 is similar but uses a single plate and an endless belt. In the invalid transfer device of U.S. Pat. No. 3,871,036, the belt circulates longitudinally rather than transversely. Another transfer system that combines a scoop-like lift with conveyor belts is illustrated in U.S. Pat. No. 6,971,126.

While these devices ideally avoid patient-caregiver contact, they work imperfectly and the caregiver usually must still do some amount of jostling of the patient as well as the transfer device. Moreover, these designs suffer from other significant disadvantages. All of these devices require unobstructed access to the individual resting on the bed. If the sides of the bed have immovable features such as rails, they prevent horizontal progress of the moving transfer table. The transfer tables themselves are rigid and so present the high localized pressure stresses on the patient as noted above. In the ’126 patent, the patient support is provided by underlying rollers instead of a table but the rollers are still rigid and generally uncomfortable. The transfer tables and other complexities of these designs further contribute to increased weight of the transfer device, often making it too heavy for manual locomotion and thus requiring a motorized system.

In light of the foregoing, it would be desirable to devise an improved patient lifting and moving device that could integrate all the desired functions in the moving cycle (lift, transfer, and transport) into a single product, while maintaining patient comfort and safety. The device would ideally be able to acquire or deliver a patient in spite of obstructions around the patient’s bed or chair. If such easy-to-use, safe, and cost-effective equipment were available to allow friends and family to care for their loved ones at home, healthcare (nursing home) costs would drop significantly, and ill and disabled patients would lead happier, more comfortable lives.

SUMMARY OF THE INVENTION

It is therefore one object of the present invention to provide an improved patient lifting and moving device for transporting a mobility-impaired individual.

It is another object of the present invention to provide such an improved patient lifting and moving device which can acquire a patient in spite of surrounding obstructions such as side rails of a bed or arms of a chair.

It is yet another object of the present invention to provide an improved lift device which is lightweight enough to easily be manually pushed.

It is still another object of the present invention to provide an improved patient lifting and moving device that is safe and comfortable for both the patient and caregiver to use.

The foregoing objects are achieved in a lift apparatus generally comprising a wheeled base, a column attached to the base, an arm supported by the column, a bridle attached to the arm, a lifting frame attached to the bridle wherein the lifting frame includes first and second frame sides with open space between the frame sides, and at least one web extendible along the lifting frame between the frame sides. In an exemplary embodiment the lifting frame is elongate, and the web extends longitudinally from a first end of the lifting frame to a second end of the lifting frame. The lifting frame can have a generally horizontal orientation, or a generally chair-like orientation, and can more generally be configurable wherein each frame side includes a middle section, a back section hinged to the middle section to pivot upwardly, and a leg section hinged to the middle section to pivot downwardly such that inclinations of the back and leg sections are selectively adjustable to provide orientations of the lifting frame ranging continuously between horizontal and upright sitting. The lifting frame can be supported proximate one end thereof by the bridle, with the bridle being rotatably attached to said arm and the arm being rotatably attached to the column, and the arm can counter-rotate with rotation of the bridle to maintain a center of gravity of the lifting frame within a stable boundary of the base.

A web assembly is preferably utilized which has (i) a first web wind-up spool located at the first end of the frame sides, (ii) an upper roller nose bar disposed between the frame sides having a smooth, arcuate forward surface, (iii) an upper web having a first end anchored at the first end of the frame sides, a loop portion wrapped around said roller nose bar, and a second end secured to the first web wind-up spool, (iv) a second web wind-up spool located at the first end of the frame sides, (v) a lower roller nose bar disposed between the frame sides having a smooth, arcuate forward surface, (vi) a lower web having a first end anchored at the first end of the frame sides, a loop portion wrapped around the lower roller nose bar, and a second end secured to the second web wind-up spool, (vii) a third web wind-up spool located at the first end of the frame sides, and (viii) a strength layer having a first end secured to the third web wind-up spool and a second end secured to the lower roller nose bar. Hems of the strength layer along the frame sides can be securely wrapped around cables disposed in interior portions of the frame sides and slidably retained by pairs of track rods. The roller nose bars can be divided into segments to impart transverse flexibility across a leading edge of the web assembly, and one or more flexible strips can be attached to the segments to secure them adjacent one another.

Means can be provided for pulling the roller nose bar assembly away from the anchored ends of the webs to thereby extend the web assembly along the frame sides. In an illustrative embodiment a cable system is used wherein a cable has a first end secured to a cable take-up spool located at the first end of the frame sides, a loop portion wrapped around a pulley located at the second end of the frame sides, and a second end attached to the roller nose bar assembly.

A hand-held power tool can be provided which is adapted to drive the web assembly, drive the cable system, drive adjustment of inclinations of the back and leg sections of the frame sides, and drive vertical motion of the lift arm.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
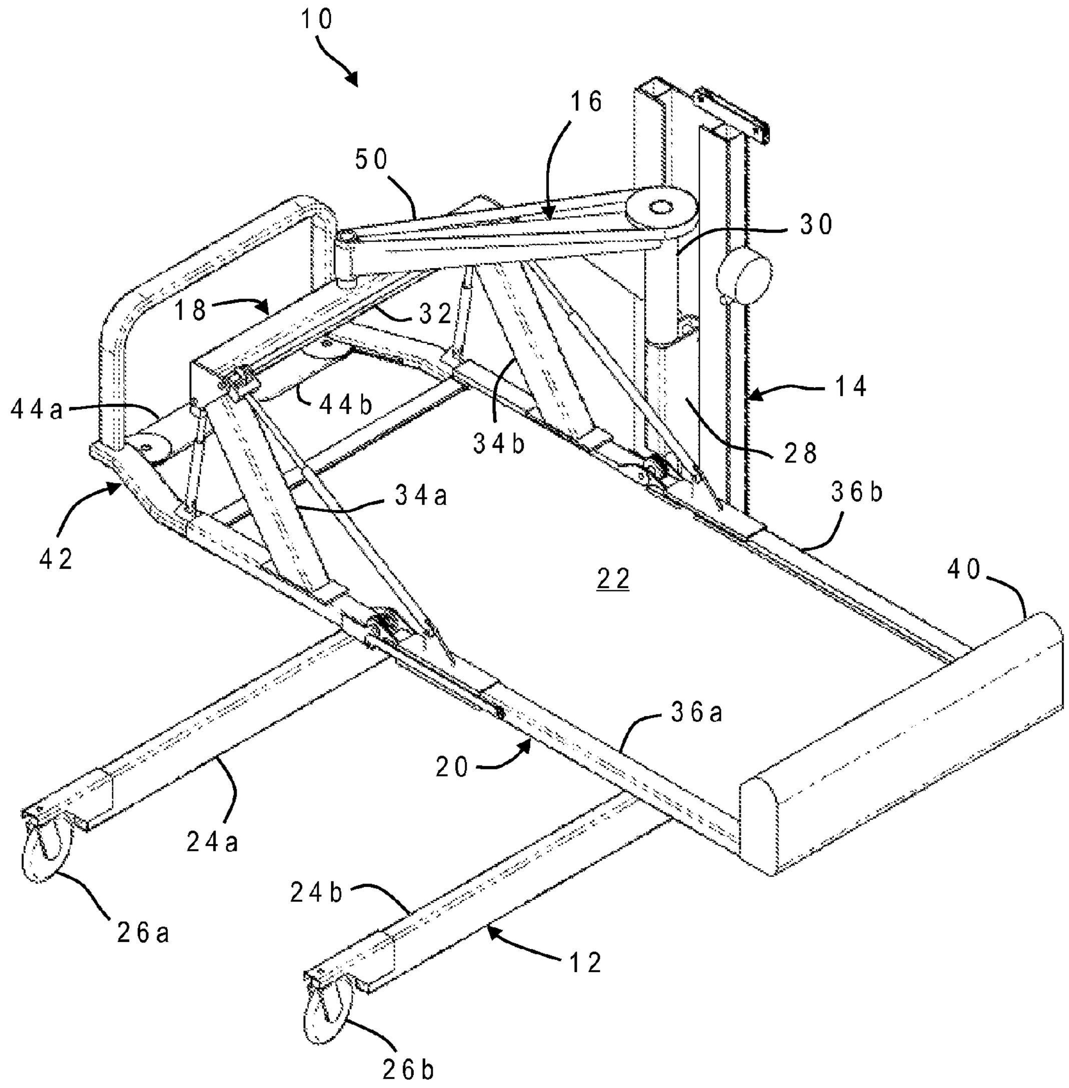
FIG. 1 is a perspective view of one embodiment of a lift chair constructed in accordance with the present invention, with a lifting frame deployed in a horizontal orientation and a supporting web assembly in an extended position.

With reference now to the figures, and in particular with reference to FIG. 1, there is depicted one embodiment 10 of an improved patient lifting and moving device or lift chair constructed in accordance with the present invention. Lift chair 10 is generally comprised of a base 12, a vertical column 14 attached to base 12, a lifting arm 16 coupled to column 14, a bridle 18 supported by lifting arm 16, an elongate lifting frame 20 attached to bridle 18, and a supporting web assembly 22 which can be extended or retracted longitudinally along lifting frame 20. In this embodiment base 12 has two horizontal beams 24*a*, 24*b* with casters at each end, two of which 26*a*, 26*b* are visible in FIG. 1. The lower end of column 14 is fixed to base 12, and a riser 28 moves vertically along column 14 to raise or lower lifting arm 16. One end of lifting arm 16 is rotatably mounted to riser 28 by means of a shaft 30. The other end of lifting arm 16 is rotatably mounted to a crossbar 32 of bridle 18. Bridle 18 further includes two legs 34*a*, 34*b* extending downwardly with their upper ends attached to the ends of crossbar 32 and their lower ends attached to mid-portions of sides 36*a*, 36*b* of lifting frame 20. Riser 28 may be raised and lowered under power using any convenient means such as a lead screw and nut system, a rack and pinion system, or a winch and cable system.

Frame sides 36*a*, 36*b* are generally parallel and, in the orientation of FIG. 1, define a generally horizontal plane which coincides with web assembly 22 in its extended position. While lifting frame 20 could be open at either end, it preferably includes other structural members at both ends to reinforce the positioning of frame sides 36*a*, 36*b*. In this particular design lifting frame 20 has a head end and a foot end, i.e., it is adapted to acquire a patient who is oriented correspondingly, and a web assembly storage housing 40 is fixed to the head ends of frame sides 36*a*, 36*b* while a cross brace 42 is fixed to the foot ends of frame sides 36*a*, 36*b*. Brace 42 includes portions which extend from frame sides 36*a*, 36*b* and are further attached to a U-shaped portion disposed orthogonally with respect to lifting frame 20. Brace 42 may also support two footrests 44*a*, 44*b* which are movable between stowed and deployed positions.

Figure 2:
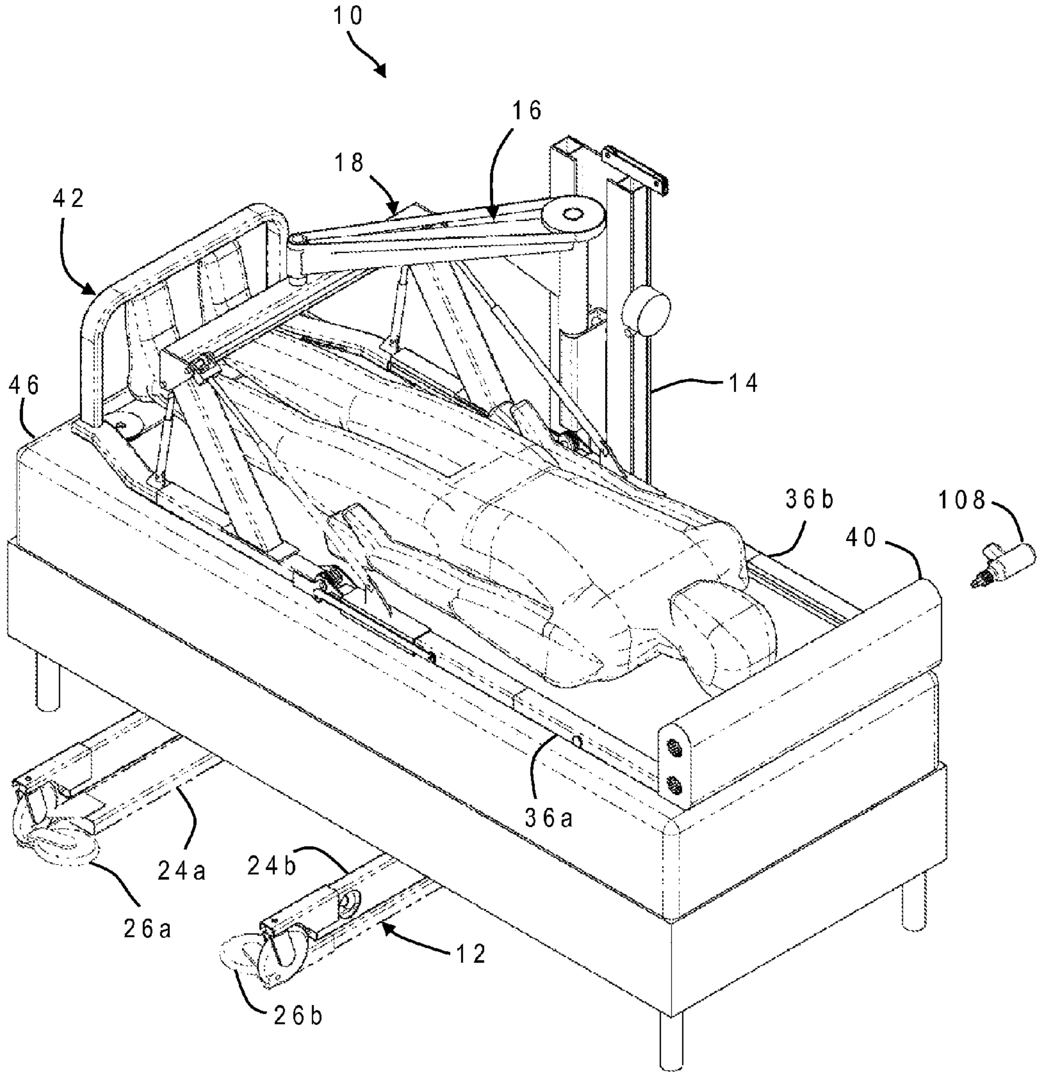
FIG. 2 is a perspective view of the lift chair of FIG. 1 illustrating acquisition of a supine individual resting on a bed.

When web assembly 22 is retracted, lifting frame 20 presents an open space between the frame sides which allows lifting frame 20 to be lowered around the patient or other object to be transported until the frame sides contact the patient support surface, as seen in FIG. 2. This empty frame design permits the device to acquire a mobility-impaired individual in spite of obstructions which may be located alongside the bed or examination table 46. In this regard the only requirement for patient acquisition is that the frame width (i.e., the distance between frame sides 26*a*, 36*b*) must be longer than the patient shoulder or waist width, and the frame length must be nominally longer than the height of the patient. When web assembly 22 is retracted it is essentially contained within web storage housing 40. As explained further below in conjunction with FIGS. 9-10, a cable assembly is used to pull a roller nose bar assembly of web assembly 22 and thereby move the web assembly to its extended position. As web assembly 22 extends from the head end of lifting frame 20 toward the foot end, it unrolls underneath the patient around the end of the roller nose bar assembly in a way that creates no relative motion and thus no pulling between the patient's body and the web assembly. As the web assembly moves from the head end to the foot end of the lifting frame, cables along the edges of the web assembly cause it to slide between rounded guide bars within frame sides 36 which secure the web assembly at its edges. Once fully extended, web assembly 22 provides comfortable support without rigid crossbars to lift the patient as lifting frame 20 is raised. Web assembly 22 does not need to be fully deployed, however, as a partial extension to just underneath the patient's thighs will allow substantial support for lifting. Notably, there are no requirements for patient preparation, and in particular there is no need to pre-position any support feature underneath the patient prior to acquisition, thereby avoiding unnecessary patient/caregiver contact.

Figure 3:
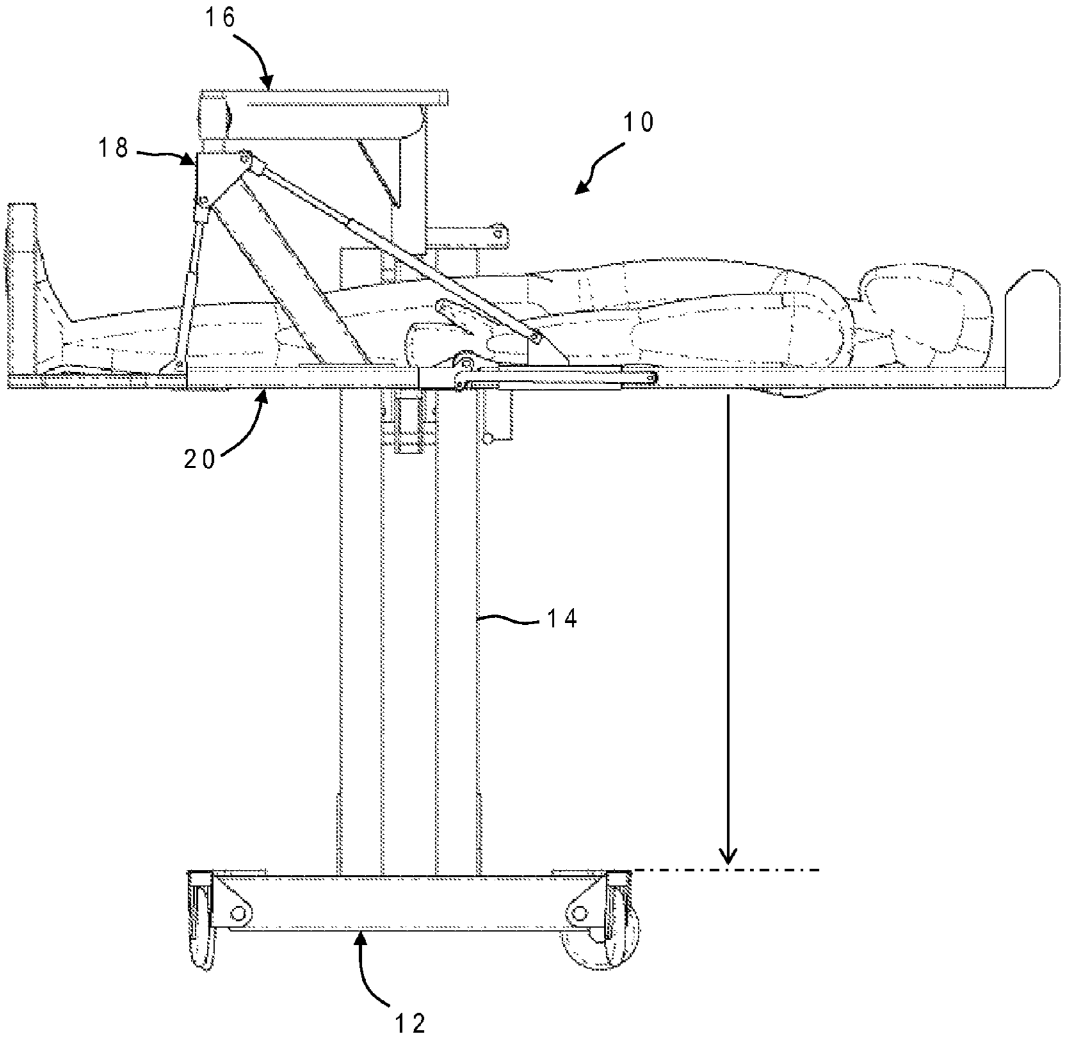
FIG. 3 is a side elevational view of the lift chair of FIG. 1 showing the lifting frame in a vertically raised position supporting the acquired individual.

FIG. 3 shows how the lifting frame may be raised above the bed or table after acquiring the patient as needed to clear any side obstructions. The downward pointing arrow in FIG. 3 also serves to illustrate the range of vertical motion of lifting frame 20. Lift chair 10 may accordingly acquire a mobility-impaired individual from a surface as low as four inches above the floor, i.e., at the same height as the top of base beams 24*a*, 24*b*. By using a base in which the spacing between the support legs containing the casters is greater than the outside width of the lifting frame, it is also possible to lift a patient from off the floor. This may be particularly useful in nursing homes where patients occasionally fall or roll out of bed.

Figure 4B:
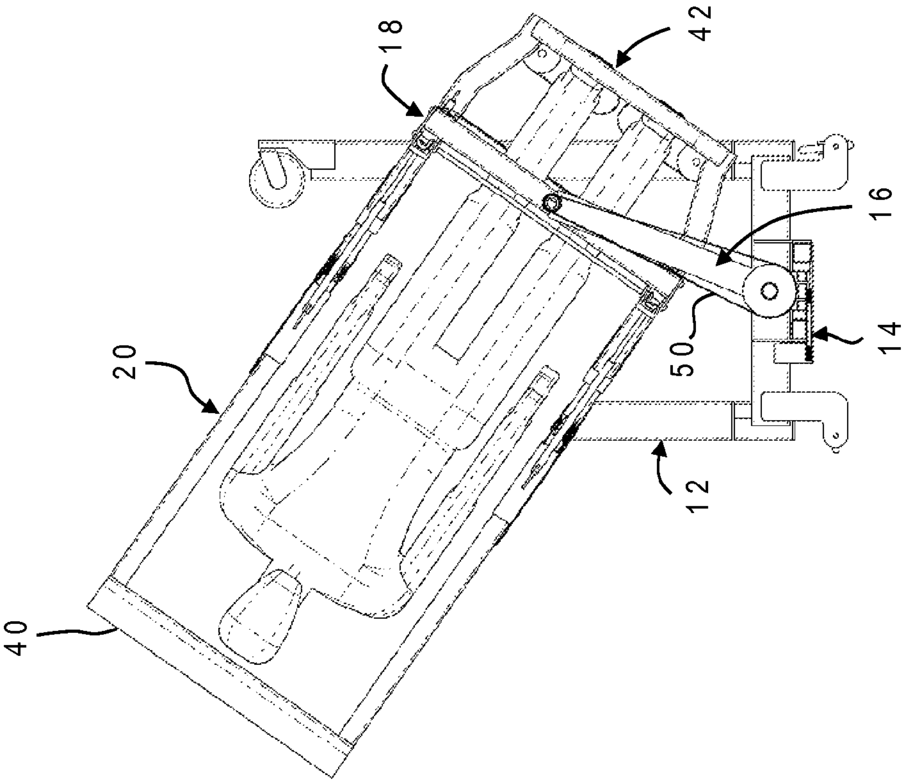
FIGS. 4A-4D are top plan views of the lift chair of FIG. 1 depicting rotation of the lifting frame and corresponding movement of the lifting arm to maintain a stable center of gravity.
Figure 4A:
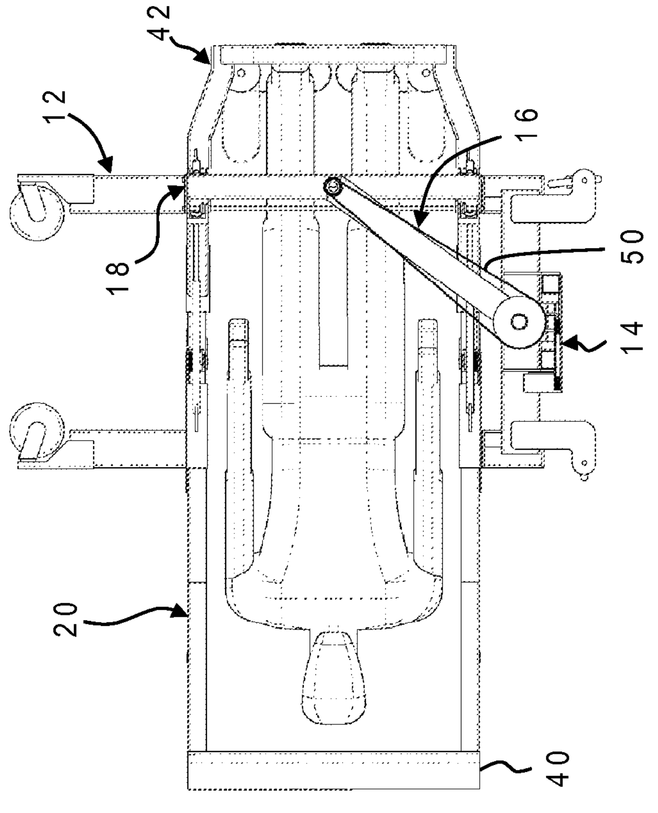
Figure 4D:
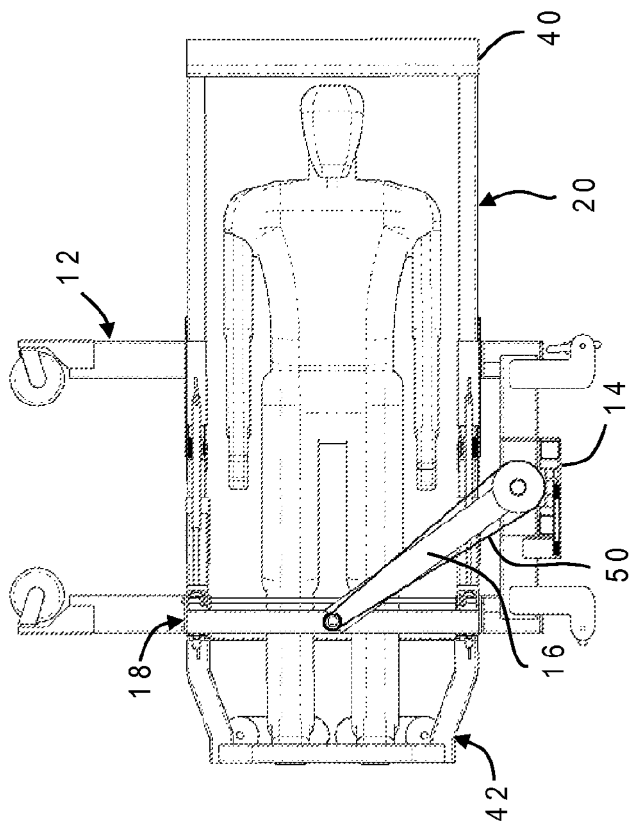
Figure 4C:
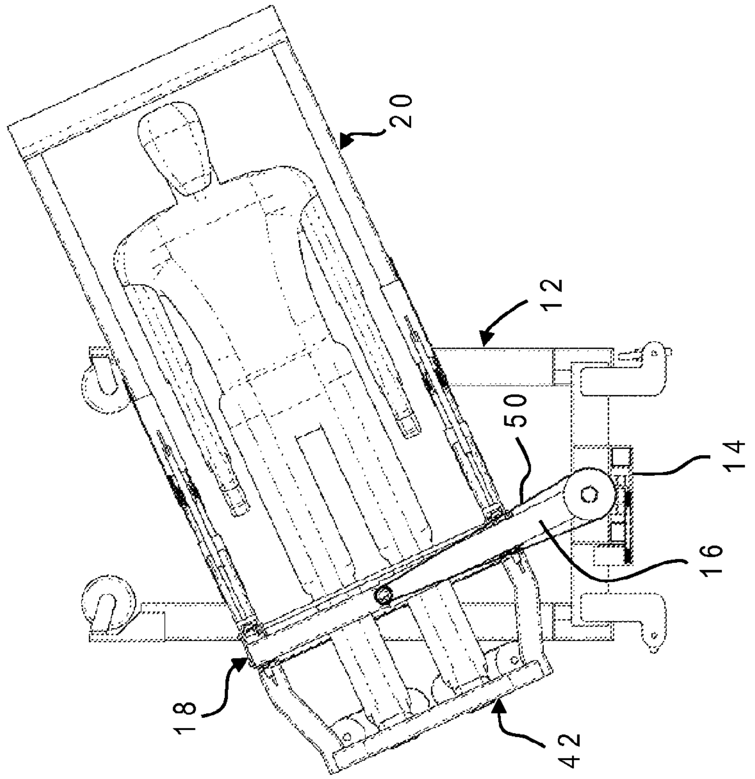

It may be desirable to change the longitudinal direction of lifting frame 20 with respect to base 12 for a variety of reasons. As described further below in conjunction with FIGS. 5-6, the lifting frame may be adjusted to a sitting orientation for the patient, and in this position it is preferable to rotate the frame by 90° so that the patient can face forward as the device is propelled. Alternatively, it may be necessary to deliver the patient to a target bed or operating table with an opposite head-foot orientation, i.e., necessitating a 180° rotation of lifting frame 20. FIGS. 4A-4D illustrate how lifting frame 20 may so rotate continuously up to 180° in the horizontal plane to accommodate such needs. In FIG. 4A, lifting frame 20 extends longitudinally in the same direction as seen in FIGS. 1-3. In FIG. 4B, lifting frame 20 has begun to rotate clockwise (as seen from above). In FIG. 4C, lifting frame 20 has moved past the halfway point in its rotational range (about)150°. Finally, in FIG. 4D, lifting frame has moved to a completely opposite longitudinal orientation from FIG. 4A.

It can be seen in FIGS. 4A-4D that the upper portion of bridle 18 is not centrally located but rather is proximate one end of lifting frame 20 (in this embodiment, proximate the foot end). This construction allows for the full 180° rotation of lifting frame 20 with respect to base 12 while still maintaining a relatively short length for lift arm 16, i.e., just long enough to allow clearance for brace 42 as it moves past shaft 30. Further, offsetting the bridle toward the foot end of the patient support frame provides more space and openness around the patient's lap area, resulting in a better patient experience with the device. This geometry may be further enhanced for rotation by clipping the corners of brace 42, giving it the trapezoidal shape seen in FIGS. 4A-4D. However, the asymmetrical placement of the bridle could also lead to a weight imbalance caused by overextension of the lifting frame to one side of the base if the lift arm were improperly located. Accordingly, for this illustrative embodiment, lift arm 16 is allowed to rotate in order to compensate for the orientation of lifting frame 20. It can further be seen in FIGS. 4A-4D that the angle of lift arm 16 with respect to base 12 changes as lifting frame 20 rotates. The change is inverse, e.g., rotation of lifting frame 20 in a clockwise direction results in rotation of lift arm 16 in a counter-clockwise direction. In this manner, the center of gravity of lifting frame 20 and its adjunct features (roughly the center of gravity of the patient) remains within a boundary of base beams 24*a*, 24*b*, or sufficiently close thereto to maintain stability. The rotation of lift arm 16 can be synchronized with rotation of lifting frame 20 by various means. In this embodiment, synchronization is achieved using a chain 50 under tension. Chain 50 engages teeth of a first sprocket that is coaxial with shaft 30, but is fixed to the non-rotating internal support of shaft 30 or an extension thereof, and engages teeth of a second sprocket surrounding a shaft which rotatably supports crossbar 32, wherein the sprockets are appropriately sized to impart the desired synchronization factor.

Figure 5:
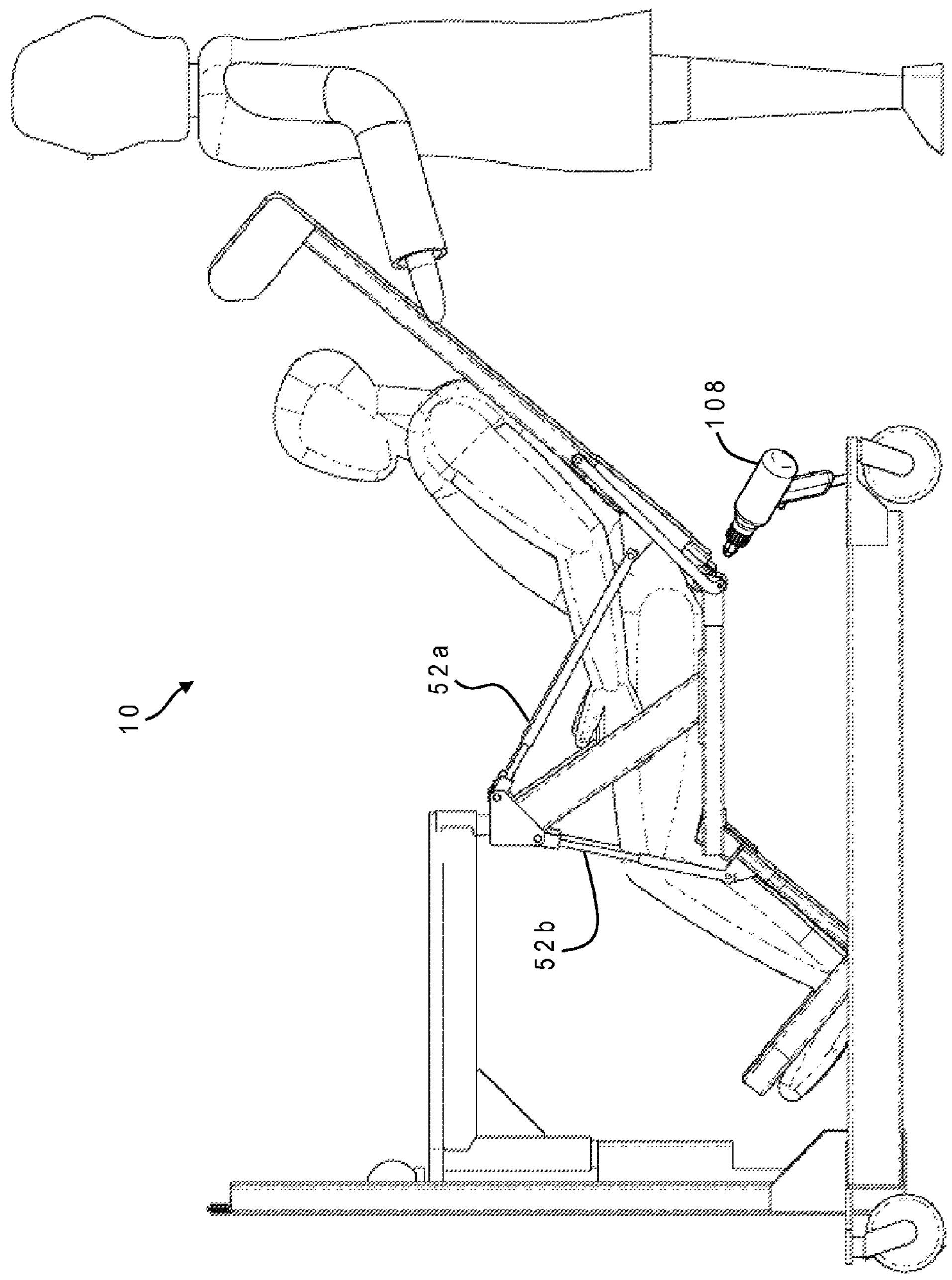
FIG. 5 is a side elevational view of the lift chair of FIG. 1, with the lifting frame adjusted to support the individual in an intermediate (reclined) position.
Figure 6:
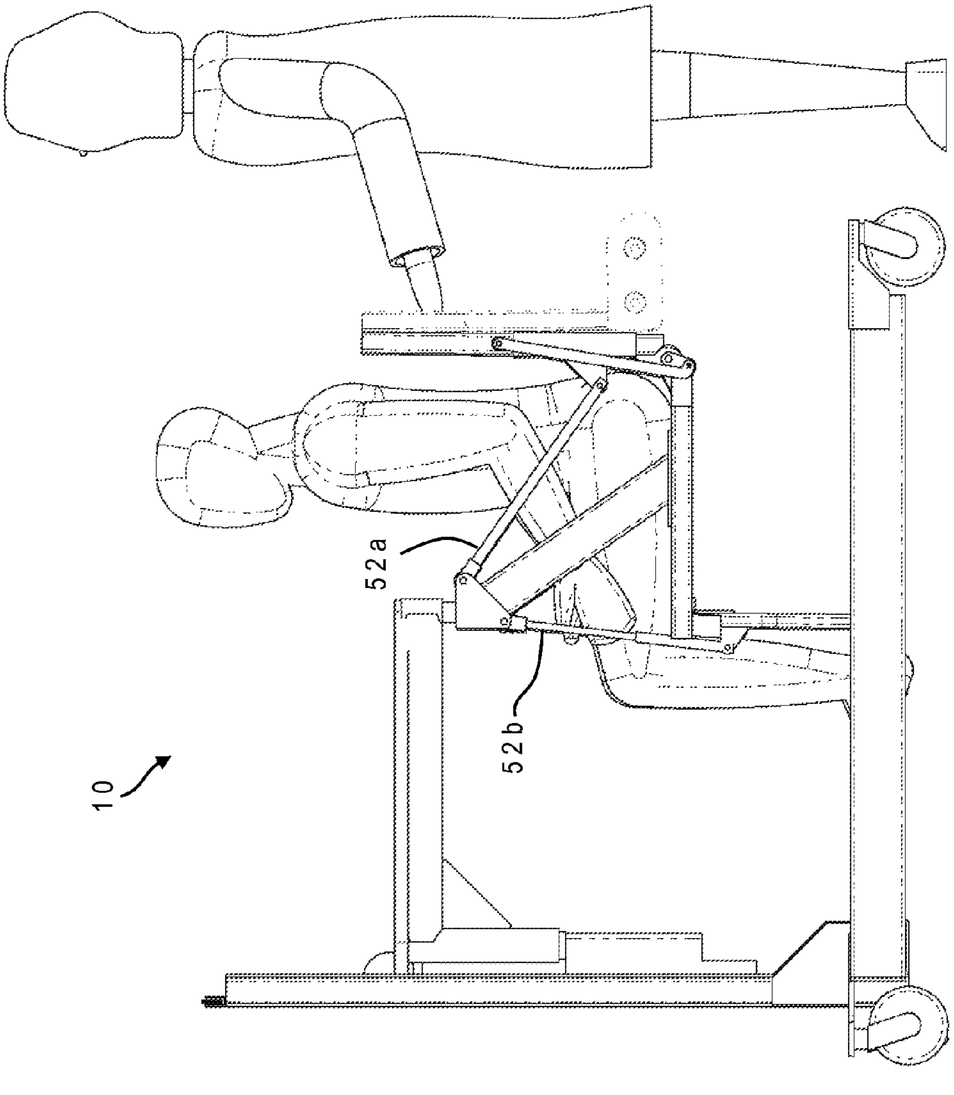
FIG. 6 is a side elevational view of the lift chair of FIG. 1, with the lifting frame further adjusted to support the individual in an upright (sitting) position, and with an uppermost portion of lifting frame folded approximately 180° to provide an unobstructed view for the caregiver when transporting the patient longer distances.

While the present invention contemplates transport of the mobility-impaired individual in the prone position with the flat lifting frame as seen in FIGS. 2-4, it may further advantageously allow adjustment of the lifting frame to provide different orientations according to patient preference. In the illustrative embodiment, lifting frame 20 is divided into three sections, an upper (back) section, a middle (hip) section, and a lower (leg) section. In other words, each frame side 36*a*, 36*b* has three sections, with the upper and lower sections being hinged to the middle section. In this manner, the upper section can pivot upwardly in a continuous range to a maximum of 90° to provide back support for the individual, and the lower section can pivot downwardly in a continuous range to a maximum of 90° to allow the individual's legs to bend comfortably at the knee. FIG. 5 illustrates adjustment of the frame sections to present an intermediate or reclined orientation, and FIG. 6 shows further adjustment of the frame sections to present a chair orientation wherein the patient is sitting upright, but other positions are also selectively configurable. For this implementation bridle 18 is provided with telescopic struts 52*a*, 52*b* attached at their distal ends to the upper and lower sections of a given frame side, to provide support while still allowing hinged movement of the lower and upper frame sections. For the orientations of FIGS. 5-6 brace 42 may also serve as a footrest. Once the patient is in the desired position for transport, the operator may manually push against the back of the lifting frame to move lift chair 10, similar to pushing a shopping cart.

If the orientation of lifting frame 20 is so adjusted when web assembly 22 is extended, portions of the webs forming the web assembly may bunch up or pucker, particularly at the hinge line between the upper and middle frame sections. The upper frame sections may additionally be extendible (e.g., telescopic) to take up or let out web slack at this hinge.

The inclination of the back and leg frame sections may be changed relative to the hip and upper leg frame sections using double lead screw actuator systems (one for each side of the back and lower leg lifting frame sections) that are connected at their first ends to pivot eyes at the ends of the horizontal cross member of the lifting bridle, and at a second end to pivot eyes located beyond the hinge points on the back and lower leg frame sections of the patient support frame. The first end of the screw jack actuators for the lower leg frame sections are driven through bevel gears from a common cross shaft that is adjacent and parallel to the horizontal cross member of the lifting bridle, and located on the opposite side of the cross member relative to the position of the patient. Similarly, the first end of the screw jack actuators for the back frame section (containing the enclosure for the patient support and contact webs) are also driven through bevel gears from a common cross shaft that is adjacent and parallel to the cross member of the lifting bridle, and located on the same side of the cross member relative to the patient.

The set of screw jack assemblies for the back or lower leg portions of the lifting frame may be powered manually by a crank, or by engaging a hand-held power (electric) tool 108 into a drive socket located at the ends of the screw jack cross shafts (for either the back or lower leg frame sections) adjacent bridle crossbar 32. The power tool may have any suitable drive head such as a hex-type fitting (Allen wrench) sized to fit snugly in the mating drive socket. Power tool 108 is preferably tethered to lift chair 10 and the tether may also serve as wiring to a battery or other power source. Alternatively, power tool 108 may have an internal rechargeable battery. Power tool 108 may also be used to drive the vertically raising and lowering of riser 28.

As another option in the implementation of the present invention, the upper section of lifting frame 20 may be further hinged so that a portion thereof can be folded downward behind the patient as seen in FIG. 6. This feature allows the operator to more easily see over the device during transport.

Figure 7:
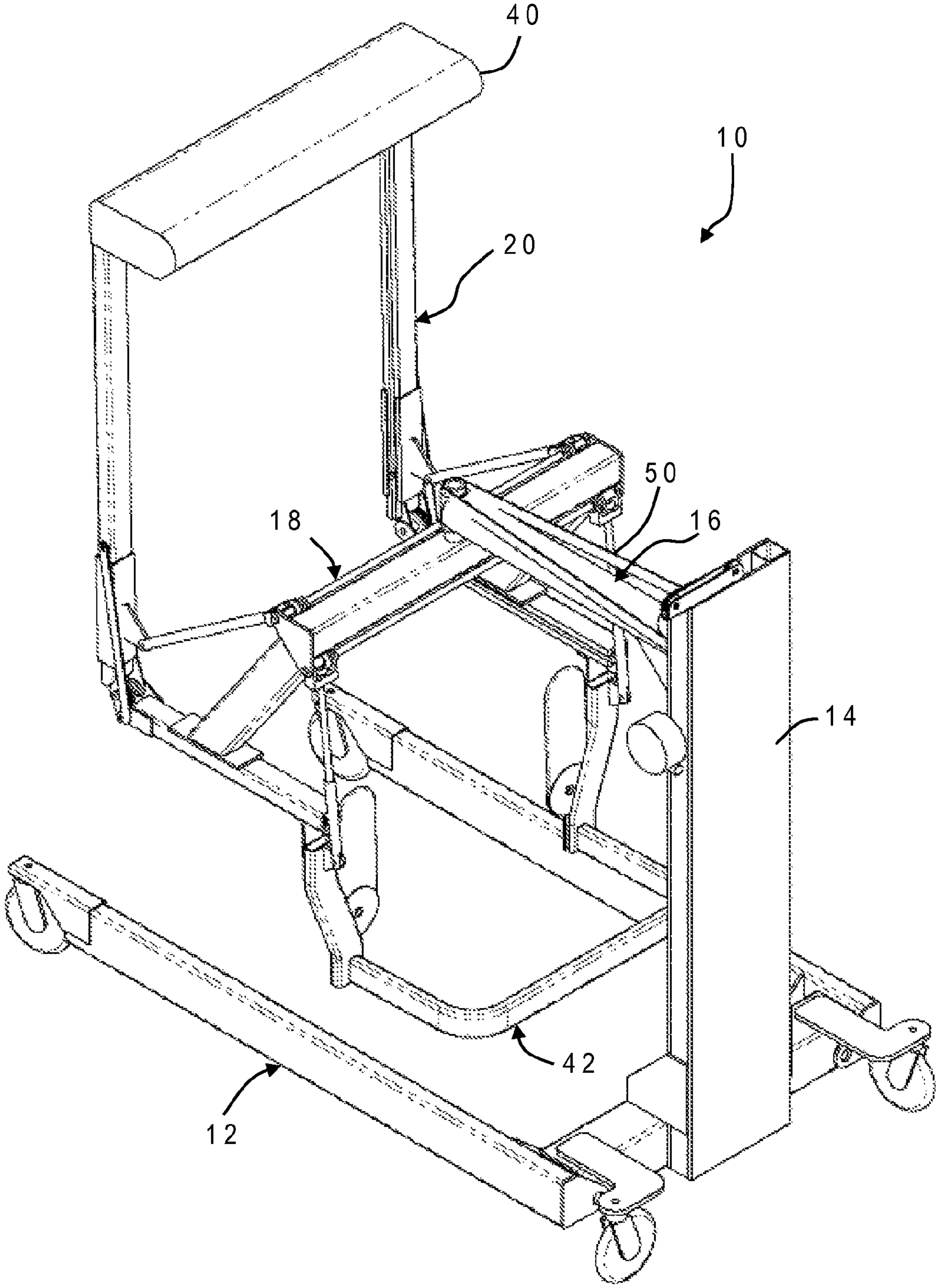
FIG. 7 is a perspective view of the lift chair of FIG. 1, illustrating the upright frame position with the supporting web assembly retracted for acquisition of an individual in a seated position.
Figure 8:
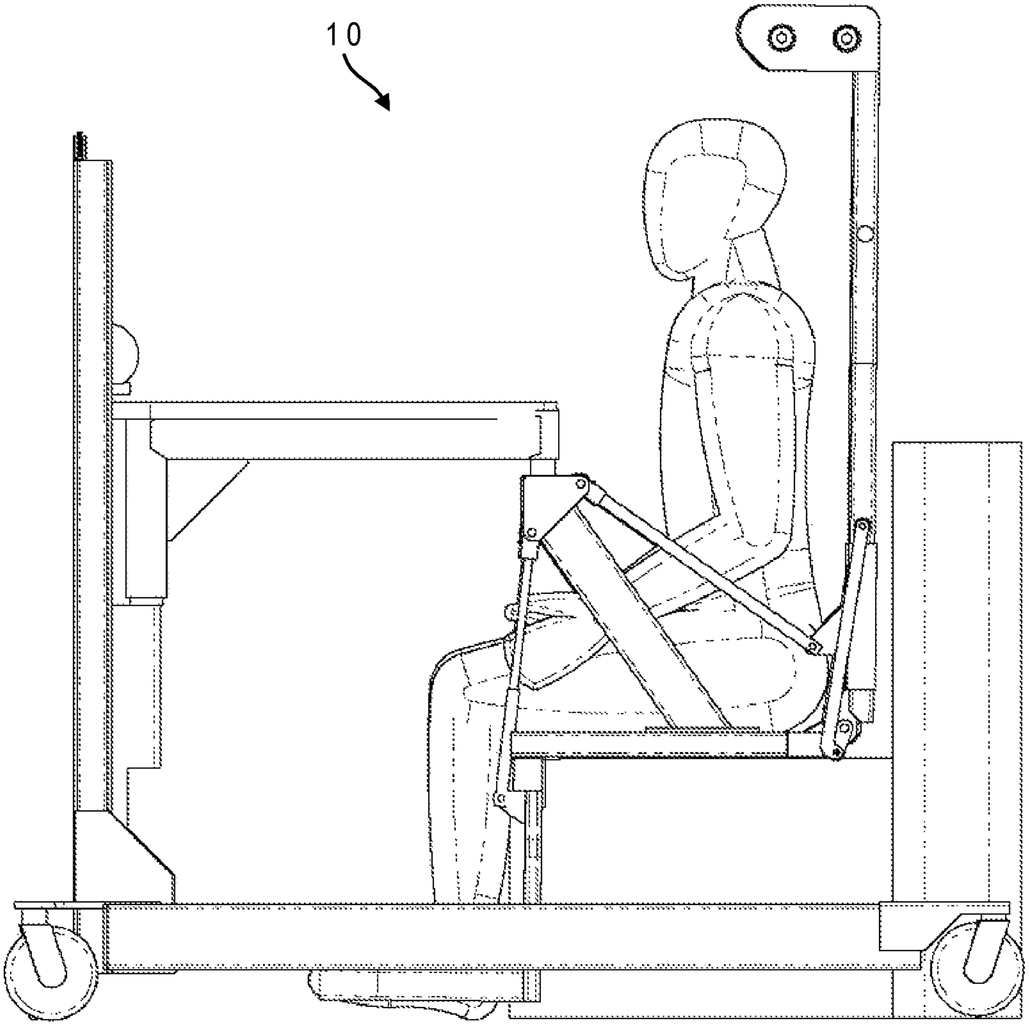
FIG. 8 is a side elevational view depicting one manner for acquisition of an individual sitting on a toilet or chair in accordance with the present invention.

The foregoing description uses an example wherein the patient is first acquired in a prone position with lifting frame 20 in the horizontal orientation, but in this embodiment lift chair 10 can just as easily be used to acquire a patient who is reclining in a chair or sitting on a toilet. For such patient acquisitions, the operator simply begins by adjusting lifting frame 10 to the reclined or sitting position as appropriate, with web assembly 22 retracted as shown in FIG. 7, and locating the device in front of the patient. Then, rather than lowering lifting frame 20, lift chair 10 is instead pushed toward the patient, so that lifting frame 20 again passes around him, as seen in FIG. 8. Once lifting frame 20 is pushed substantially beyond the patient, web assembly 22 can be extended down the frame, behind/under the patient, to provide lifting support.

Figure 9:
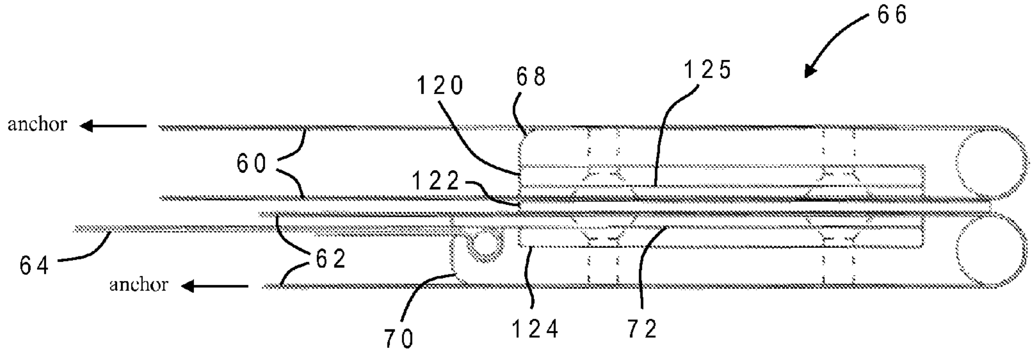
FIG. 9 is a side elevational view detailing one embodiment of the roller nose bar assembly used to extend the supporting web assembly in accordance with the present invention.
Figure 10:
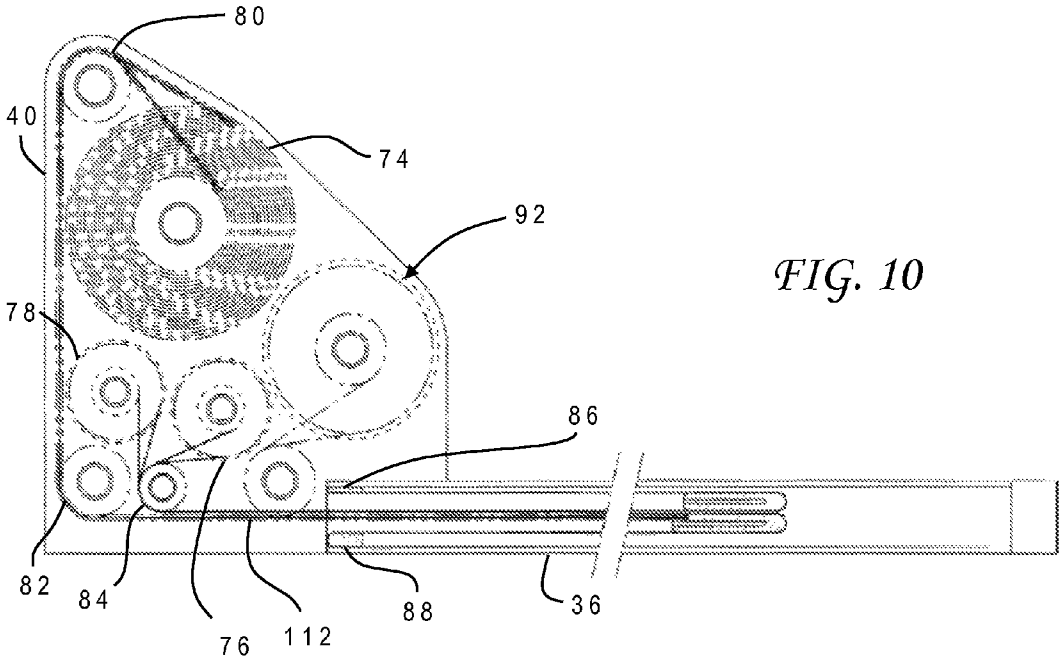
FIG. 10 is a side elevational view of a storage housing for the supporting web assembly having various spools and idlers for layers of the supporting web assembly in accordance with one embodiment of the present invention.
Figure 11:
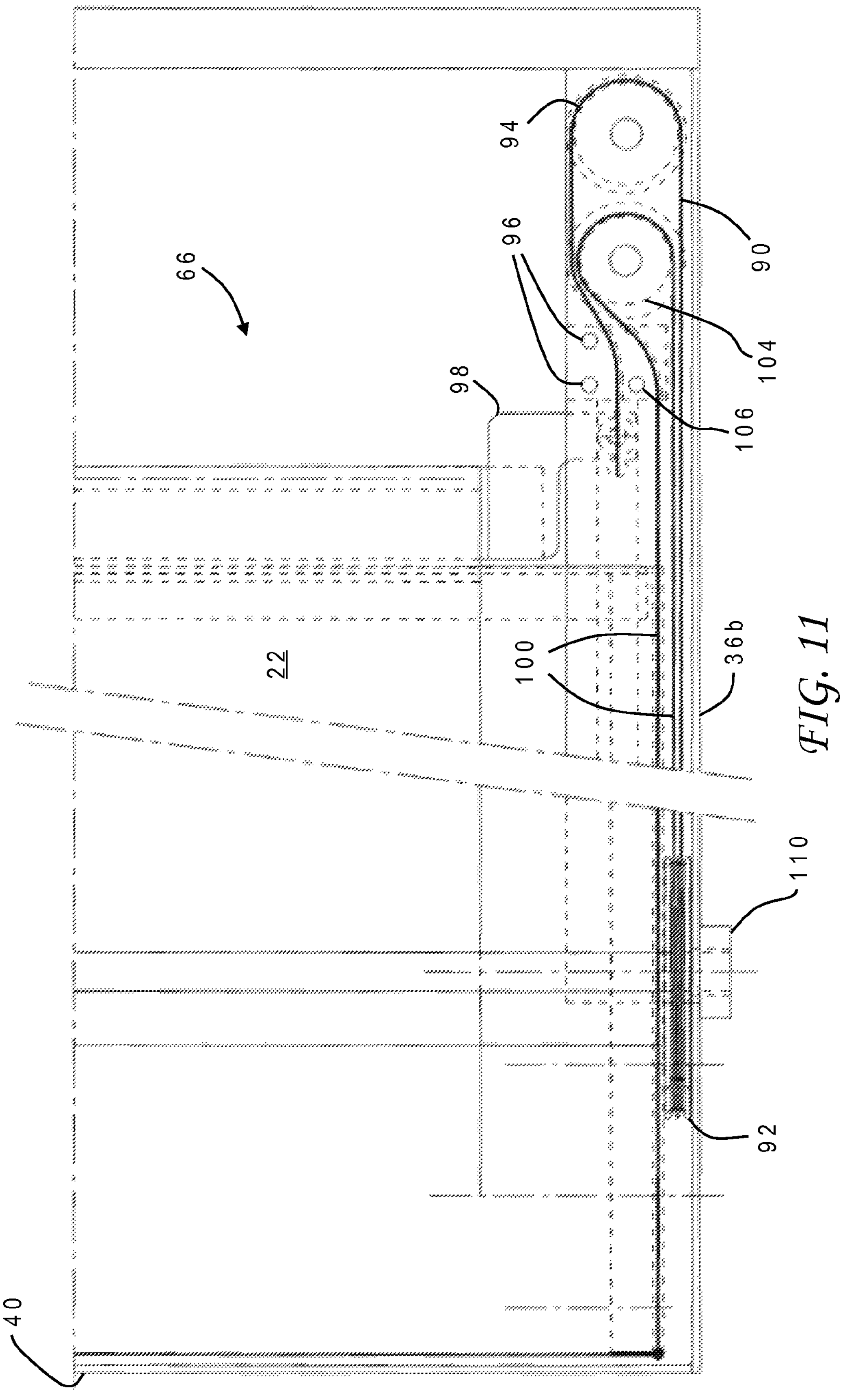
FIG. 11 is a top plan view detailing one embodiment of a cable, pulley and spool assembly for pulling a roller nose bar assembly to extend the supporting web assembly in accordance with the present invention.

The preferred construction for web assembly 22, and the manner of its extension and retraction, may be further understood with reference to FIGS. 9-11. Web assembly 22 can include three flexible web layers: an upper web layer 60 for contact with the patient, a lower web layer 62 for contact with the support surface (bed or table), and a strength layer 64. FIG. 9 depicts a generally flat roller nose bar assembly 66 which can be provided at the leading edge of web assembly 22. Roller nose bar assembly 66 can include a series of adjacent upper roller nose blocks 68 and a series of adjacent lower roller nose blocks 70, each having a smooth forward surface that is generally semicircular (on the right side in the view of FIG. 9). Each of the roller nose blocks is constructed of a flexible material that has a relatively low coefficient of friction (less than about 0.15) for example ultra-high molecular weight (UHMW) polyethylene or polytetrafluoroethylene, or the forward semicircular surfaces can have a low friction coating such as polytetrafluoroethylene, so the upper and lower web layers can effortlessly slide across the outer surfaces of the roller nose blocks (alternatively, the front edges of the blocks can be outfitted with rollers). Upper web layer 60 is wrapped around the forward, semicircular surface of upper roller nose blocks 68, and lower web layer 62 is wrapped around the forward, semicircular surface of lower roller nose blocks 70. One end of upper web layer 60 (its outer loop within the web assembly) is anchored proximate web storage housing 40, while the other end is taken up on a first supply spool within web storage housing 40. Similarly, one end of lower web layer 62 (its outer loop within the web assembly) is anchored proximate web storage housing 40, while the other end is taken up on a second supply spool within web storage housing 40. In this manner, as roller nose blocks 68, 70 are pulled forward (in this embodiment, from the head end of lifting frame 20 toward the foot end) the upper and lower webs are pulled out from their respective supply spools, and the webs evert or extrude out the front of roller nose bar assembly 66 to slide between the patient and the bed/table/chair with essentially no frictional engagement.

The forward end of strength layer 64 may be secured to either upper roller nose block 68 or lower roller nose block 70; in this example strength layer 64 is secured to the back edges of lower roller nose blocks 70 by wrapping the leading edge around a metal rod which is held within a groove of lower roller nose block 70 by a clamping plate 72. Plate 72 may be secured to lower roller nose block 70 by any convenient means, such as fasteners which pass through holes in the plate and the block. The front edge overlap of strength layer 64 is stitched to form a reinforced hem as described further below in conjunction with FIG. 12.

The other end of strength layer 64 is wound on a supply spool 74 located within web assembly storage housing 40 as illustrated in FIG. 10, which further illustrates the upper web supply spool 76 and the lower web supply spool 78. The spools are mounted on horizontally-disposed shafts which are rotatably attached to the interior of housing 40. Two idler rollers 80, 82 are provided for strength layer 64, and a single idler roller 84 is provided for upper and lower web layers 60, 62. Anchor points 86, 88 for the upper and lower web layers 60, 62 can also be seen in FIG. 10.

While the invention may be practiced with only a single web layer, a separate strength layer is preferred to fortify the patient support, and two contacting layers are preferred to reduce frictional engagement. The use of flexible webs to support the patient provides greater comfort than the rigid tables, trays or rollers of the prior art which can result in painful pressure sores. The present invention avoids such rigid underlying supports by instead providing rigid structure only at the periphery of the lifting apparatus, i.e., lifting frame 20. Those skilled in the art will appreciate, however, that use of this specific web assembly is not meant to be construed in a limiting sense. For example, the preferred implementation clamps the strength layer in the roller nose and wraps the other webs around the front of the roller nose, but the invention could be carried out with a strength layer which wraps around the front of the roller nose instead.

Roller nose blocks 68, 70 can be pulled forward, and thereby extend web assembly 22, by various means including manually pulling the roller nose bar assembly or using linkages and gears, but preferably web assembly 22 is extended using cable systems located within frame sides 36*a*, 36*b*. As depicted in FIG. 11, a first cable 90 runs along the interior of frame side 36*b*. One end of cable 90 is wrapped around a first groove of a cable supply spool 92. Cable supply spool 92 is mounted on another horizontally-disposed shaft which is rotatably attached to the interior of housing 40. The other end of cable 90 passes around a first pulley 94 and against guide rollers or a polymeric slider block 96, and is clamped or otherwise attached to a connecting block 98. Connecting block 98 is affixed to one side of roller nose bar assembly 66 by any convenient means such as threaded fasteners. In this manner, when cable supply spool 92 is wound to take up cable 90, the distal end of cable 90 pulls roller nose bar assembly 66 forward and moves web assembly 22 from the head end of lifting frame 20 toward the foot end.

A single cable running along each frame side 36*a*, 36*b* is sufficient to pull roller nose bar assembly 66 forward, but the invention is preferably implemented with an additional set of cables which pull at the side edges of strength layer 64 to move web assembly 22 more smoothly as it is extended. In FIG. 11, a second cable 100 runs along the interior of frame side 36*b* generally parallel to roller nose cable 90. One end of web edge cable 100 is wound on a second groove in spool 92. The other end of web edge cable 100 passes around a second pulley 104 and against another guide roller or a polymeric slider block 106, and passes through a side hem 114 of strength layer 64 as further illustrated in FIG. 12. In this embodiment roller nose cable 90 is located toward the outside of lifting frame 20 and web edge cable 100 is located toward the inside of lifting frame 20, so pulley 104 is located within the loop formed by cable 90 around pulley 94. Spool 92 can be spring-loaded to maintain a wind-up bias.

FIG. 11 illustrates only one side 36*b* of lifting frame 20 but the other side 36*a* has the same (mirror image) cable assemblies. All four of the cable spools (the roller nose cable spool and the web edge cable spool at side 36*a*, and the roller nose cable spool and the web edge cable spool at side 36*b*) are preferably mounted on the same rotating shaft to keep the leading edge of the roller nose even (perpendicular to the frame sides) as it moves forward, although other means can be provided to synchronize cable movements. In a further variation of the cable system, roller nose cable 90 can break out into two cables whose distal ends are secured respectively to upper and lower roller nose blocks 68, 70.

A manual crank may be used to wind cable supply spool 92 in order to extend web assembly 22, but lift chair 10 is preferably supplied with power tool 108 adapted to engage a drive socket attached or coupled to the shaft of the cable supply spool. The power tool may operate in only one rotational direction to prevent accidental unwinding of the cables. For example, if the spool drive socket 110 is placed as shown in the top plan view of FIG. 11 (which may be considered the right side of lifting frame 20) and the cables are wound around the spool as shown in FIG. 10 using another idler roller 112, then the engaging feature of power tool 108 might move only in a counter-clockwise direction to drive socket 110 counter-clockwise and thereby wind up cables 90, 100.

Web assembly 22 can be retracted by rotating web supply spools 74, 76, 78 to wind up webs 60, 62, 64. The rotation of the web supply spools can be synchronized using gears, slip clutches, one-way clutches, or other mechanical linkages so that all three spools move in unison and retract the three webs evenly without buckling or stretching. The drive mechanism for retracting the web assembly may again be manual as with a crank or may utilize power tool 108. During retraction of web assembly 22, spool 92 is free to rotate (under slight slip clutch bias) and let out cables 90, 100. When web assembly 22 is fully retracted, the bulk of the webs are stowed in housing 40 and roller nose bar assembly 66 is located just outside of housing 40.

Mechanical means may be used to limit movement of web assembly 22 or spool 92 but in the preferred embodiment the movements are limited by providing “smart” drive sockets. These sockets have electrical contacts in fixed outer locations which connect to contacts located along the face of the power tool, and complete (close) the electrical circuit which powers tool 108. The drive sockets further have an inner switch which opens when the drive socket is moved to its limit position. In other words, the power tool will only have electricity when the drive socket is not pushed to the limit position, and the electricity will automatically be cutoff once the drive socket rotates to the limit position.

Figure 12:
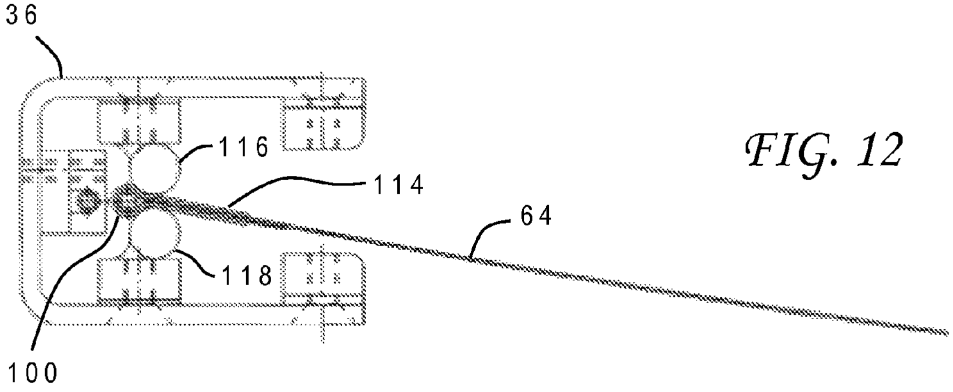
FIG. 12 is a front elevational view of one side of the lifting frame with portions of the web assembly removed to illustrate the retention of the strength layer in a track which guides the supporting web assembly in accordance with one embodiment of the present invention.

With further reference to FIG. 12 (which shows only the strength layer portion of the web assembly for illustration), side hem 114 of strength layer 64 can be formed by tightly folding a strip of the strength web material over a side edge of strength layer 64, and securing the strip to the edge with stitching or other convenient means. Web edge cable 100 is preferably plastic-coated to allow the texture of the wrapped strength material to embed into the coating and better grip the cable, so the cable can more securely pull the edges of strength layer 64 forward. This return loop of web edge cable 100 is slidably retained within the U-shaped frame side 36 by a pair of bearing rods 116, 118 mounted along the interior of frame side 36, forming a track which pinches hem 114. Rods 116, 118 are preferably constructed of or coated with a low-friction material such as previously described, to allow strength layer 64 to easily slide forward or backward while still securely gripping the edges and supporting strength layer 64 under tension from weight of the patient. The outside surfaces of hems 114 can also have a sewn-on low-friction strip or a coating or film such as polytetrafluoroethylene or UHMW polyethylene to reduce friction and wear between the strength member web and the cylindrical guide rods inside the lifting frame channels.

Figure 13:
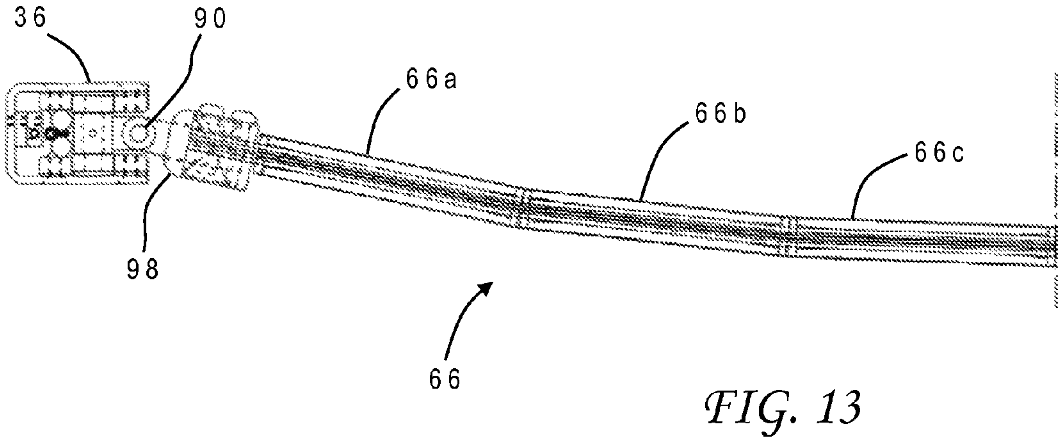
FIG. 13 is a front elevational view of one side of the supporting web assembly secured in the frame track, depicting segmented blocks and a flexible strip of the roller nose bar assembly in accordance with one embodiment of the present invention.

FIG. 13 is a similar view to FIG. 12 but shows a segmented construction of roller nose bar assembly 66 which may be used to impart a more flexible (and hence, more comfortable to the patient) leading edge to web assembly 22. FIG. 13 illustrates three of the roller nose segments 66*a*, 66*b*, 66*c* on one side of web assembly 22. Roller nose bar assembly 66 also has the same segmented construction on the other side for a total of six segments in this example. Each roller nose segment includes an upper roller nose block portion and a lower roller nose block portion as seen in FIG. 9. Three flexible reinforcing spring steel strips 120, 122, 124 (FIG. 9) extending the full width of web assembly 22 can be threaded through each roller nose segment. The upper and lower strips 120, 124 can be secured to the upper and lower roller nose blocks with clamping plates and fasteners while the middle strip 122 is interposed between upper web layer 60 and lower web layer 62. All three strips 120, 122, 124 are secured at their ends to connecting blocks 98.

Figure 14:
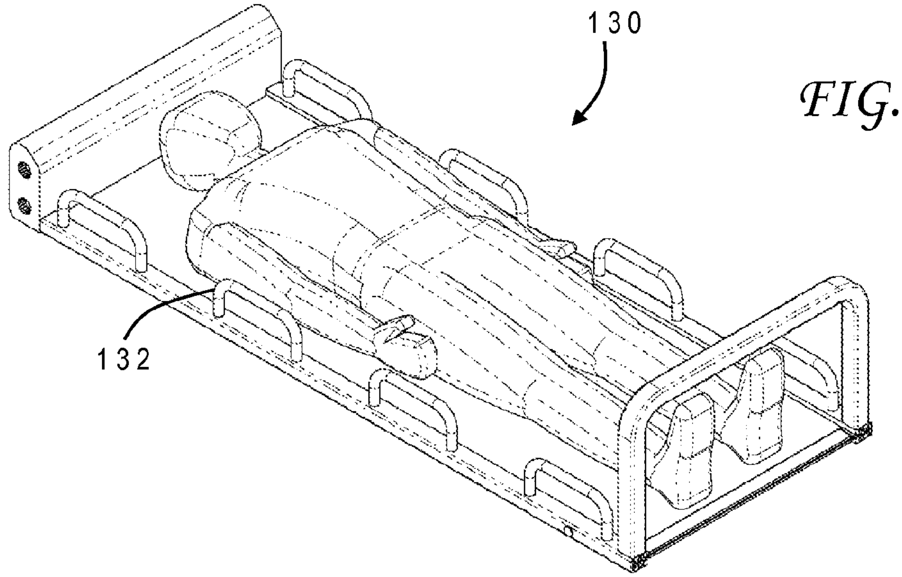
FIG. 14 is a perspective view of another embodiment of the invention implemented without a lift base but similar to a stretcher to pick up an individual off the ground or floor.
Figure 15:
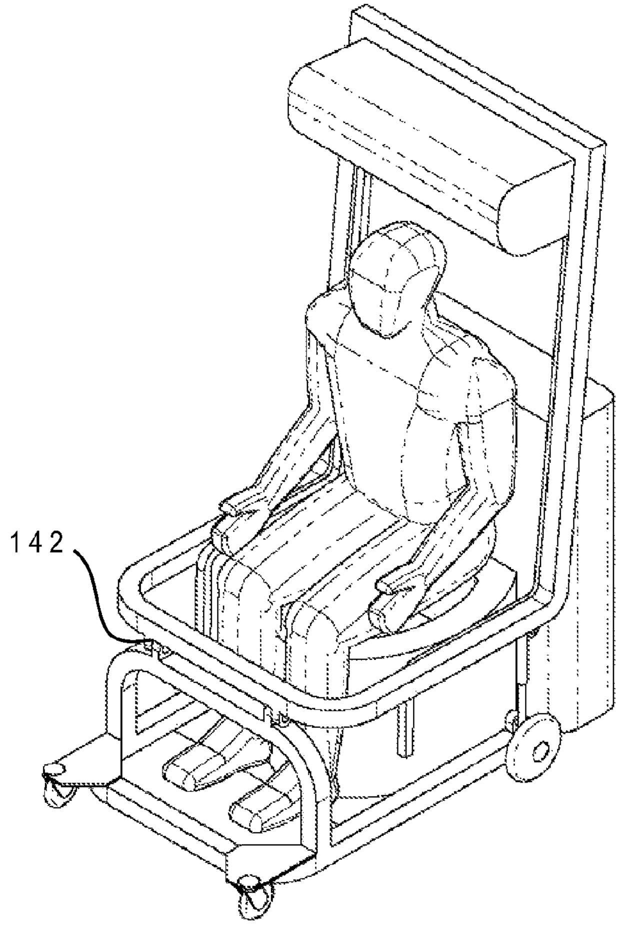
FIG. 15 is a perspective view of yet another embodiment of the invention implemented without a lift but similar to a wheelchair to deliver or acquire an individual from a chair or toilet.

While the preferred implementation of the invention utilizes both the novel web assembly construction and a lifting arm/riser, it further contemplates usages without the lifting feature such as those illustrated in FIGS. 14 and 15. FIG. 14 shows a stretcher implementation 130 which has both the open frame and web assembly but no base or lifting mechanism. Stretcher 130 may accordingly be used to safely lift someone with an injury (fallen patient, sports player) while keeping the person flat. Handles 132 are attached around the frame for manually raising the device. Stretcher 130 may be designed as a removable component of lift chair 10. Bridle 28 can be detachable from lifting frame 20 by providing pull out releasable pins between the bottom ends of the bridle and the hip/upper leg sections of the lifting frame.

FIG. 15 depicts a wheeled transporter implementation 140 in which the frame is configured only in the chair position, without a lifting feature. The chair frame can be hinged to the base at 142 to pivot the entire frame forward so the device may be pushed back toward the subject to position the base, and thereafter the frame is folded back down to pass over and surround the subject.

The components of lift chair 10 may be constructed of any durable materials based on factors such as maximum patient weight rating and cost. In an exemplary embodiment designed for a maximum patient weight of 500 pounds, the following materials are considered suitable. Base 12 can be fabricated from welded steel tubing with steel sheet metal brackets, gussets, and fitments. Column 14, riser 28, shaft 30 and lift arm 16 can be constructed of rectangular steel tubing. Frame sides 36 and brace 42 are U-shaped welded steel tubing, with hinges having steel pivot pins operating inside bronze bushings pressed into steel plates. Housing 40 is made of steel or aluminum sheet metal or molded/vacuum-formed plastic. Upper and lower webs 60, 62 can be a light gage nylon material 0.010 inches thick. The outward surfaces of upper and lower webs 60, 62 are preferably treated or coated to have relatively low coefficients of friction (around 0.1 to 0.2) for effortless insertion under the patient and to more easily slide along the central flexible strip 122. Strength layer 64 is preferably constructed of a heavy gage nylon material approximately 0.020 inches thick. Flexible reinforcing strips 120, 122, 124 may be heat-treated spring steel containing biased curves toward one another in the roller nose bar assembly to provide a spring preload between the upper and lower portions of the roller nose assembly.

The dimensions of lift chair 10 may vary considerably depending on the desired application and will of course be larger for a device adapted to move very large individuals. The following approximate dimensions are considered exemplary for a patient having a maximum height of 77 inches and a maximum width of 26 inches. The outer width of beams 24*a*, 24*b*, lifting frame 20, housing 40 and brace 42 is 33 inches to fit through a standard 36-inch door opening. A frame side (the U-shaped tubing) is 83.5 inches long overall to fit between the head and foot boards of a standard hospital bed, 1.5 inches thick, and 2.25 inches wide. Lift arm 16 is 32 inches long. Lift arm 16 extends to a maximum height of 52 inches above floor level, and bridle 18 has a height of 12 inches above the lifting frame to result in a maximum raised height of 38 inches for lifting frame 20. Webs 60, 62 are 180 inches long and 26 inches wide. Web 64 is 90 inches long and 31 inches wide. With these dimensions and the foregoing materials, lift chair 10 weighs approximately 250 pounds making it light enough to be manually pushed by a caregiver.

The present invention can thus provide a lift chair which integrates all aspects of the patient moving process (lifting, transferring, and transporting) into a single, compact, safe, easy-to-use, and cost-effective device. Lift chair 10 has the versatility to pick up a patient laying down (prone or supine) or an individual sitting upright on a chair, and in spite of any obstructions which may be located alongside the individual. Importantly, lift chair 10 may be used to acquire or deliver a patient without any direct patient/caregiver contact. Once acquired, the patient can be transported in a safe and dignified sitting position. Further, the patient is supported on a comfortable web support surface similar to that found in a cot or in an outdoor lounge chair. There are no rigid cross braces in contact with the patients legs, hips, or back while the patient is supported in the lift chair. The device further has a large vertical lift range, and its web support provides increased patient comfort over rigid-support devices. With the use of a simple power tool, the entire transfer process can be completed effortlessly without manually turning cranks or operating foot pedals. More advanced versions of the present invention may include additional features such as powered transport using an on-board motor and rechargeable battery, or an electronic control system which allows the mobility-impaired individual to complete the lifting process without caregiver assistance. With the ability to rotate, raise and change the orientation of the patient, lift chair 10 can be used to place individuals on or remove them from a wide variety of support surfaces including beds, tables (diagnostic, examination, x-ray, operating), chairs or sofas, toilets, and car seats.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the illustrative embodiment of lift chair 10 provides a hinged frame to allow adjustment between horizontal and sitting orientations, the invention could be implemented in a design having no hinges which is usable in only one fixed orientation. Moreover, the invention is not limited to use with mobility-impaired individuals but is generally applicable to the transportation of any macroscopic object. It is therefore contemplated that such modifications can be made without departing from the spirit or scope of the present invention as defined in the appended claims.

What is claimed is:

1. A transport device comprising:
first and second frame sides;
a cross brace affixed to said frame sides;
a web assembly including
at least one web wind-up spool located at a first end of said frame sides,
at least one roller nose bar disposed between said frame sides having a smooth, arcuate forward surface, and
at least one web having a first end anchored at said first end of said frame sides, a loop portion wrapped around said roller nose bar, and a second end secured to said web wind-up spool; and
means for pulling said roller nose bar away from said anchored first end of said web to thereby extend said web along said frame sides, said pulling means including at least one cable having a first end secured to a cable take-up spool located at said first end of said frame sides, a loop portion wrapped around a pulley located at a second end of said frame sides opposite said first end, and a second end attached to said roller nose bar.

2. The transport device of claim 1 wherein said roller nose bar is divided into segments to impart transverse flexibility across a leading edge of said web assembly, and further comprising one or more flexible strips securing said segments.

3. The transport device of claim 1, further comprising handles attached to said frame sides.

4. The transport device of claim 1 wherein:
said web wind-up spool is a first web wind-up spool;
said roller nose bar is an upper roller nose bar of a roller nose bar assembly;
said web is an upper web; and
said web assembly further comprises
a second web wind-up spool located at said first end of said frame sides,
a lower roller nose bar of said roller nose bar assembly disposed between said frame sides having a smooth, arcuate forward surface, and
a lower web having a first end anchored at said first end of said frame sides, a loop portion wrapped around said lower roller nose bar, and a second end secured to said second web wind-up spool.

5. The transport device of claim 4 wherein said web assembly further comprises:
a third web wind-up spool located at said first end of said frame sides;
a strength layer having a first end secured to said third web wind-up spool and a second end secured to said lower roller nose bar.

6. The transport device of claim 5 wherein:
a first hem of said strength layer along said first frame side is securely wrapped around a first cable disposed in an interior portion of said first frame side and slidably retained by a first pair of track rods; and
a second hem of said strength layer along said second frame side is securely wrapped around a second cable disposed in an interior portion of said second frame side and slidably retained by a second pair of track rods.

7. The transport device of claim 1 wherein each frame side includes a middle section, an upper section hinged to said middle section to pivot upwardly, and a lower section hinged to said middle section to pivot downwardly such that an orientation of the transport device is changed by adjusting an inclination of at least one of said upper and lower sections.

8. The transport device of claim 7 wherein said web is extended using a hand-held power tool, and inclinations of said upper and lower sections are adjusted using said hand-held power tool.

9. A transport device comprising:
first and second frame sides;
a cross brace affixed to said frame sides;
a web assembly including
a first web wind-up spool located at a first end of said frame sides,
a second web wind-up spool located at said first end of said frame sides,
a third web wind-up spool located at said first end of said frame sides,
an upper roller nose bar of a roller nose bar assembly disposed between said frame sides having a smooth, arcuate forward surface,
a lower roller nose bar of said roller nose bar assembly disposed between said frame sides having a smooth, arcuate forward surface,
an upper web having a first end anchored at said first end of said frame sides, a loop portion wrapped around said roller nose bar, and a second end secured to said web wind-up spool,
a lower web having a first end anchored at said first end of said frame sides, a loop portion wrapped around said lower roller nose bar, and a second end secured to said second web wind-up spool, and
a strength layer having a first end secured to said third web wind-up spool and a second end secured to said lower roller nose bar; and
means for pulling said roller nose bar away from said anchored first end of said web to thereby extend said web along said frame sides.

10. The transport device of claim 9 wherein:
a first hem of said strength layer along said first frame side is securely wrapped around a first cable disposed in an interior portion of said first frame side and slidably retained by a first pair of track rods; and
a second hem of said strength layer along said second frame side is securely wrapped around a second cable disposed in an interior portion of said second frame side and slidably retained by a second pair of track rods.

11. A transport device comprising:
first and second frame sides, each frame side including a middle section, an upper section hinged to said middle section to pivot upwardly, and a lower section hinged to said middle section to pivot downwardly such that an orientation of the transport device is changed by adjusting an inclination of at least one of said upper and lower sections;
a cross brace affixed to said frame sides;
a web assembly including
at least one web wind-up spool located at a first end of said frame sides,
at least one roller nose bar disposed between said frame sides having a smooth, arcuate forward surface, and at least one web having a first end anchored at said first end of said frame sides, a loop portion wrapped around said roller nose bar, and a second end secured to said web wind-up spool wherein said web is extended using a hand-held power tool, and inclinations of said upper and lower sections are adjusted using said hand-held power tool; and means for pulling said roller nose bar away from said anchored first end of said web to thereby extend said web along said frame sides.

* * * * *